United States Patent [19]

Zievers et al.

[11] Patent Number: 5,328,492
[45] Date of Patent: Jul. 12, 1994

[54] FILTRATION APPARATUS

[75] Inventors: James F. Zievers, LaGrange; Peter Aguilar, Forest View; Paul Eggerstedt, Plainfield, all of Ill.

[73] Assignee: Industrial Filter & Pump Mfg. Co., Cicero, Ill.

[21] Appl. No.: 18,831

[22] Filed: Feb. 18, 1993

[51] Int. Cl.$^5$ .................................... B01D 46/04
[52] U.S. Cl. ........................... 55/302; 55/523; 55/525
[58] Field of Search ............ 55/96, 97, 284, 302, 55/303, 523, 525

[56] References Cited

U.S. PATENT DOCUMENTS

| | | | |
|---|---|---|---|
| 4,247,310 | 1/1981 | Borst | 55/96 |
| 4,298,360 | 11/1981 | Poll | 55/302 X |
| 4,544,389 | 10/1985 | Howeth | 55/302 |
| 4,632,680 | 12/1986 | Klimczak | 55/302 |
| 4,909,813 | 3/1990 | Eggerstedt | 55/302 |
| 5,062,867 | 11/1991 | Klimczak | 55/96 |
| 5,167,676 | 12/1992 | Nakaishi et al. | 55/96 |

*Primary Examiner*—Robert Spitzer
*Attorney, Agent, or Firm*—Patnaude, Videbeck & Marsh

[57] ABSTRACT

The present invention is a combined gas flow resistance device and safety shield which incorporates a plurality of narrow parallel passageways through which filtered gas from a plurality of filter elements passes to a clean gas outlet. The device also has inlet for carrying pulses of high pressure gas to the downstream side of a plurality of filter elements, and a porous safety shield connected across the passageways to prevent solid particles from passing from the filter elements to the clean gas outlet.

12 Claims, 2 Drawing Sheets

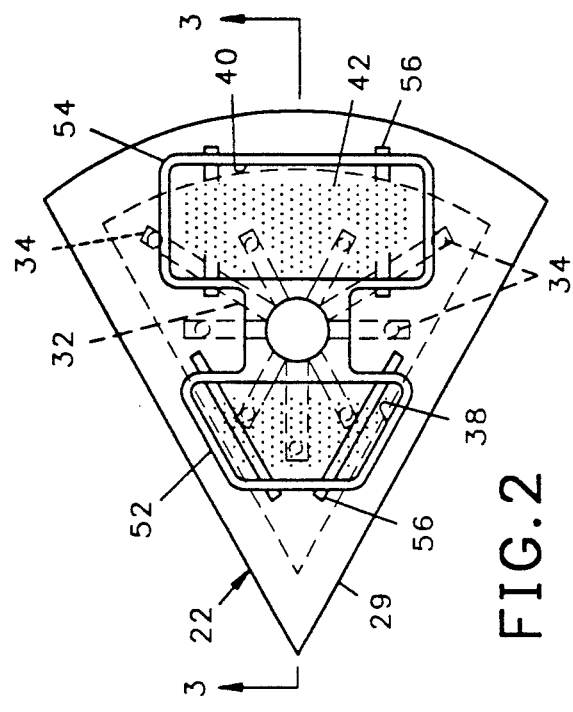
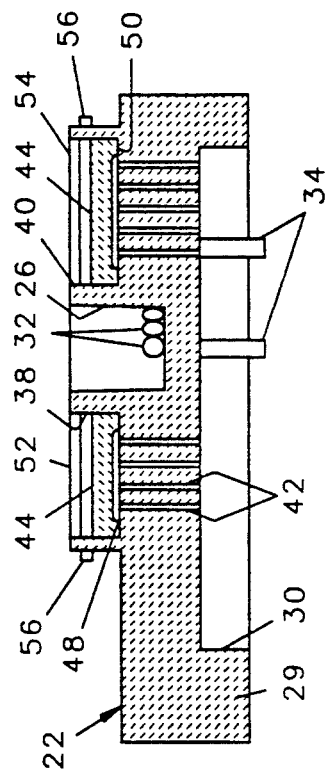
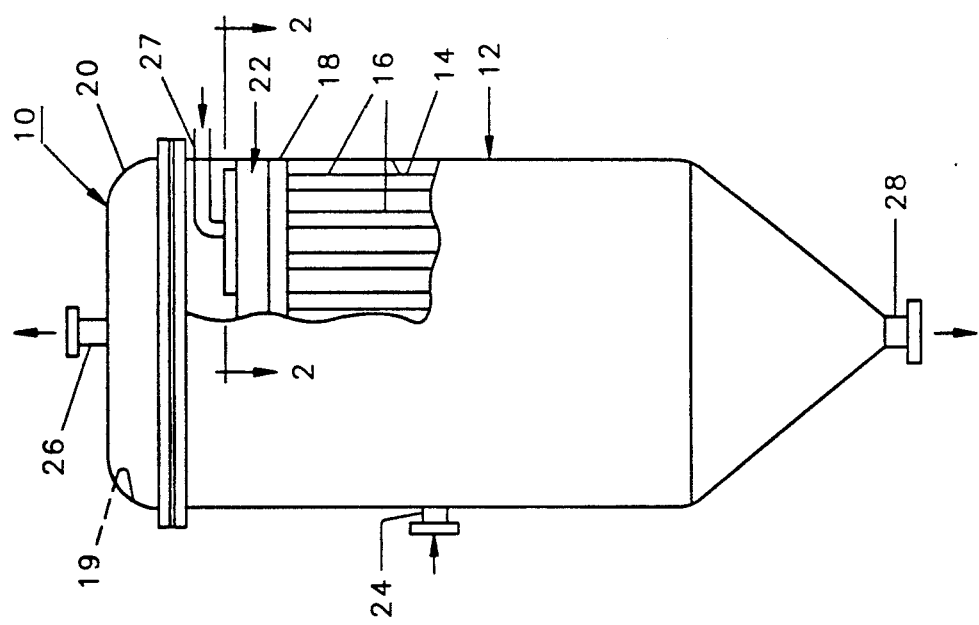

FILTRATION APPARATUS

The present invention relates in general to apparatus for filtering entrained solids from hot gas, and it relates more particularly to a new and improved system and apparatus for cleaning the filter elements in hot gas filters.

BACKGROUND OF THE INVENTION

In hot gas filtration where high temperature dirty gas is passed through one or more porous filter elements to remove entrained solids from the gas, a layer of solid particles is deposited on the upstream surfaces of the filter elements as the gas is passed through the filter elements. It is necessary to remove such layers when the pressure across these layers unduly interferes with the operating efficiency of the filter. A preferred method of removing such layers is to apply bursts of a clean gas at high pressures, commonly referred to as jet pulses, to the downstream sides of the filter elements to cause a flow of cleaning gas in a direction opposite to the flow of gas through the filter elements during the normal filter cycle, thereby to blow the layer of solid particles off of the upstream surfaces of the filter elements and into the filter chamber. This can be done without taking the filter off line and without interrupting the flow of dirty gas to the filter elements by applying relatively high pressure bursts of cleaning gas to the downstream sides of the filter elements and staggering such bursts from one filter element or group of filter elements to another.

In order to prevent such high pressure bursts of cleaning gas from passing directly out of the filter without first passing in the reverse direction through the filter elements, it is known to position flow resistance devices, commonly known as enhancers, in the output lines from the filter elements. U.S. Pat. No. 4,909,813 describes such flow resistance devices in greater detail. These enhancers include a plurality of elongate, narrow passageways through which all of the cleaned gas must pass as it travels from the filter elements to the output of the filter and which provide a resistance to gas flow which is proportional to the velocity of the flow. Because of the relatively low velocity flow of gas through these passageways during the normal filter cycle, the enhancers do not provide any appreciable resistance to the normal flow of gas from the filter elements to the outlet of the filter. However, during the cleaning cycle when the velocity of gas to the downstream sides of the filter elements is appreciably increased by virtue of the high velocity jet pulses of cleaning gas, the enhancers provide a greatly increased resistance to gas flow which is greater than the resistance offered by the filter elements and the associated layers of particles deposited thereon to the reverse flow of gas therethrough. This increased resistance is sufficient to prevent any significant amount of cleaning gas from passing through the enhancers and thus out of the filter without first flowing back through the filter elements to dislodge the layers of solids from the upstream surfaces of the filter elements.

Because of the high temperature of the gas to which the enhancers are subjected, such enhancers have been made of ceramic, and for some applications, particularly where the holes through the enhancers must be extremely long and narrow to provide the required resistance during the backwash operation, manufacture of the enhancers has been both difficult and expensive. It would, therefore, be desirable to provide an improved enhancer which could be manufactured in a less expensive manner.

It would be further desirable to incorporate in such an enhancer a porous safety shield which is sufficiently strong to act as a safety backup filter to prevent dirty gas from passing through the filter in the event of a catastrophic break in one or more of the filter elements, or by a leak or failure of the filter element seals.

SUMMARY

Briefly, there is provided in accordance with one aspect of the present invention a new and improved enhancer which consists of a plurality of interfitted sections each having a plurality of elongate passages extending therethrough. The holes through the sections are arranged in tandem when the sections are mutually assembled and the greater the number of sections used, the greater the resistance of the enhancer to gas flow therethrough. Mounted in the enhancer is a porous safety shield which normally passes gas from the associated filter or filters and which is sufficiently strong to block the passage of solids in the event of a catastrophic break in one or more of the associated filter elements or a leak or failure of a filter element seal. In one embodiment of the invention the safety shield is a ceramic sponge, while in another embodiment it is a layer of ceramic cloth.

In a preferred embodiment of the invention, there is provided a new and improved enhancer which is part of a plenum and jet pulse gas feed assembly mounted in association with a group of filter candles in a filter tank. Gas from the associated filter elements flows into the plenum chamber and then through the enhancer to the outlet chamber of the filter.

GENERAL DESCRIPTION OF THE DRAWINGS

A more complete and better understanding of the present invention will be had from a reading of the following detailed description of a preferred embodiment of the invention taken in conjunction with the accompanying drawings wherein:

FIG. 1 is a partially cross-sectioned elevational view of a filter embodying certain features of the present invention;

FIG. 2 is a horizontal cross-sectional view taken along the line 2—2 of FIG. 1 and constituting a top view of a combined plenum, jet pulse feed system, and gas flow resistance assembly embodying the present invention;

FIG. 3 is a cross-sectional view of the assembly shown in FIG. 2 taken along the line 3—3 thereof;

DETAILED DESCRIPTION OF A PREFERRED EMBODIMENT

Figure 6:
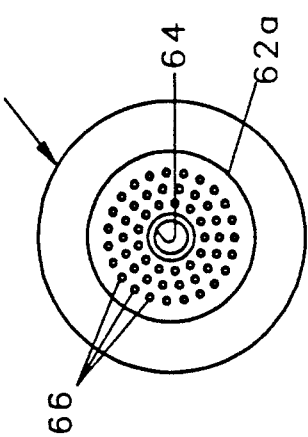
FIG. 6 is a top view of the combined flow resistance and safety shield shown in FIG. 5.

Referring now to the drawings and particularly to FIG. 1 wherein is shown a pressure filter 10 for filtering solid particles out of a hot gas in which the particles are entrained. The filter includes a tank 12 which encloses a filter chamber 14 in which a plurality of conventional generally tubular porous filter elements 16 are disposed. The filter elements 16 are arranged in groups or sets, and each of the filter elements 16 is suspended from one of a plurality of wedge shaped support members 18 which are suitably mounted in the tank 12 in mutually sealed relationship and in sealed relationship to the wall of the tank so as to seal the filter chamber from an outlet chamber 19 in a tank cover 20 which is sealably mounted over the top of the tank 12 in a conventional manner. Each of the supports 18 is generally wedge shaped with an arcuate distal edge, and similarly shaped cover assemblies 22, best shown in FIGS. 2, 3, and 4, are sealably mounted over respective ones of the supports 18 within the tank 12.

The hot gas to be cleaned is supplied under pressure to the filter chamber 14 through an inlet duct 24 which extends through the wall of the tank 12 and passes through the filter elements 16 and then through the cover assemblies 22 to the outlet chamber in the tank cover 20. The cleaned gas from which entrained solid particles have been filtered then passes out of the chamber 19 through a clean gas outlet duct 26 which extends through the cover 20 into the outlet chamber 19.

Extending through the wall of the tank 12 are a plurality of cleaning gas inlet ducts 27, only one of which is visible in FIG. 1, which carry high pressure bursts of cleaning gas through the assemblies 22 to each of the filter elements 16 as more fully described below. When a burst of high pressure cleaning gas is blown into a set of the filter elements 16, any particles which have been deposited on the exterior surfaces of the filter elements are dislodged and fail under the force of gravity to the bottom of the tank 12. A solids outlet duct 28 having a large diameter extends through the bottom of the tank 12 and is used when the filter is off line and the filter chamber 14 is at atmospheric pressure to remove the solid particles which had settled to the bottom of the tank 12 while the filter was on line.

Figure 4:
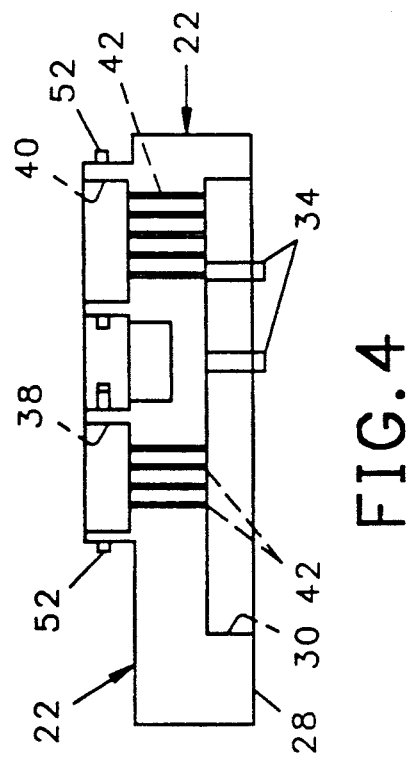
FIG. 4 is a side elevation of the assembly as viewed from the bottom of FIG. 2.

Referring to FIGS. 2-4, the cover assembly may be seen to include a body member 29 molded of a refractory material such as ceramic and which is wedge shaped in horizontal cross section and has a wedge shaped cavity 30 in the bottom which overlies the open upper ends of the filter elements 16 when the cover member 22 is mounted to the associated support member 18. A generally cylindrical recess 26 is provided in the top of the member 29 and a plurality of holes 32 extend through the body member 29 in generally radial directions as best seen in FIG. 2 and respectively connect to a plurality of nozzles 34 which depend into respective ones of the associated filter elements 16. The nozzles are preferably constructed of aluminum oxide. The recess sealably receives the inner end of the associated one of the cleaning gas inlet ducts 27. Accordingly the high pressure bursts of cleaning gas are supplied to the duct 27 jets at high velocity, high pressure gas are directed into the group of filter elements located below the cover assembly 22.

The body member further includes two additional recesses 38 and 40 which are respectively positioned directly above a plurality of narrow, rectilinear passageways 42 which extend between the recesses 38 and 40 at the top of the member 22 and the recess 30 at the bottom. The recesses 38 and 40 are open onto the chamber 19 in the cover 20 of the filter and thus feed the cleaned gas thereto.

In order to prevent dirty gas from passing out of the filter through the clean gas outlet 26 in the event of a catastrophic break in one or more of the filter elements 16, a pair of porous safety shields 44 are positioned in the bottom of the recesses 38 and 40 and are sealed to the body member 22 by a pair of gaskets 48 and 50 which are of the type which expand as their temperature increases. The safety shields 44 may be formed of a porous ceramic sponge material or may be one or more layers of a porous woven ceramic cloth.

In order to hold the safety shields in place in the cavities 38 and 40, the body member is provided with upstanding bosses 52 and 54 which are continuous and surround the cavities 38 and 40. The bosses 52 and 54 are crossed drilled to receive a plurality of hold down rods 58, two per safety shield, which overlie the top surfaces of the safety shields and prevent them from being pushed up and out of the recesses 38 and 40 by the gas pressure from the filter elements.

Figure 5:
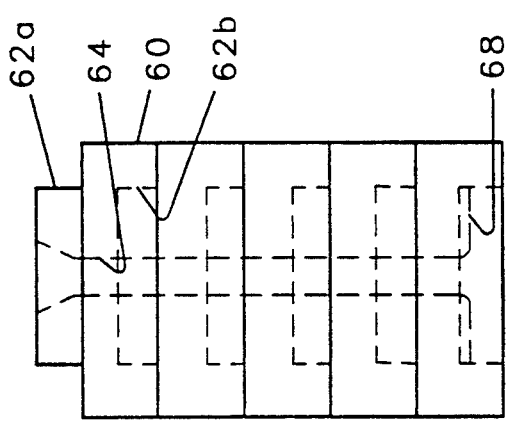
FIG. 5 is a side elevational view of another combined flow resistance and safety shield assembly embodying the present invention.

Referring to FIG. 5, there is shown a flow resistance device 60 which comprises a plurality of separate identical sections 62 which are preferably formed of ceramic and which are bonded together by a high temperature adhesive. Each of the sections 62 is generally circular in cross section and has a cylindrical upstanding portion 62a and a cylindrical recess 62b in the bottom which is adapted to receive the portion 62a of the next adjacent section 62. A central hole 64 extends longitudinally through the section 62 for use in feeding high pressure cleaning gas through the device 60 to one or more associated filter elements. The upper end of the hole 64 is flared to tightly receive a cleaning gas feed conduit. The upstanding portion 62a and the body of the section 62 are provided with a plurality of parallel narrow through holes 66 through which clean gas flows from the associated filter elements to the outlet of the associate filter.

Mounted in the recess 62b of the lowermost section 62 is an annular safety shield 68 which is sufficiently porous to pass the clean gas from the associated filter elements to the holes 66 but not to pass the particles entrained in the dirty gas supplied to the associated filters. Preferably the safety shield 68 is a woven ceramic cloth or a porous ceramic sponge which is sufficiently strong to prevent particles from reaching the holes 66 in the event of a catastrophic break in one or more of the associated filter elements. The safety shield 68 is held in place by a high temperature bonding material and includes a central opening through which high pressure cleaning gas passes during the filter cleaning operation.

While the present invention has been disclosed in connection with particular embodiments thereof, it will be understood that those skilled in the art may make many changes and modification without departing from the true spirit and scope of the invention, and it is intended by the appended claims to cover all such changes and modifications which come within the true spirit and scope of the invention.

What is claimed is:

1. A gas flow resistance device for resisting the flow of gas from the downstream side of a plurality of filter elements connected between a gas inlet and a gas outlet, comprising in combination
   a body formed of a refractory material,
   a first plurality of parallel, narrow passageways extending through said body, and
   a first porous safety shield mounted across one end of said first plurality of parallel narrow passageways for preventing solid particles from travelling between said filter elements and said gas outlet.

2. The invention according to claim 1, wherein said safety shield is a porous ceramic material.

3. The invention according to claim 2, wherein said porous ceramic material is a ceramic sponge.

4. The invention according to claim 2, wherein said porous ceramic material is a woven ceramic cloth.

5. The invention according to claim 1, wherein said body comprises
a plurality of molded members fitted together in tandem between said filter elements and said gas outlet.

6. The invention according to claim 5 wherein said first plurality of narrow parallel passageways comprise parallel passageways within each said molded member and said parallel passageways of each said member are aligned with the passageways of the others of said molded members.

7. The invention according to claim 1, comprising
a second plurality of narrow, parallel passageways extending through said body, and
a second porous safety shield mounted to said body over one end of said second plurality of narrow, parallel passageways.

8. The invention according to claim 7, comprising
a cleaning gas inlet on one side of said body,
a plurality of radial passages extending through said body from said cleaning gas inlet, and
a plurality of nozzles connected to the distal ends of said first and second plurality of narrow parallel passageways and depending from said body for supplying cleaning to the downstream sides of said filter elements.

9. The invention according to claim 1 wherein said body is provided with a plenum recess into which said first plurality of parallel narrow passageways and the downstream side of said filter elements open.

10. The invention according to claim 9, and further comprising a plurality of nozzles which extend through said plenum recess.

11. The invention according to claim 10, wherein said body comprises
at least one recess on the side thereof opposite to said plenum recess, and
said first porous safety shield being mounted in said at least one recess.

12. The invention according to claim 11, wherein said body is wedge shaped in cross section.

* * * * *